No. 626,423. Patented June 6, 1899.
J. H. HARGENS.
EDUCATIONAL APPLIANCE.
(Application filed Feb. 3, 1899.)
(No Model.)
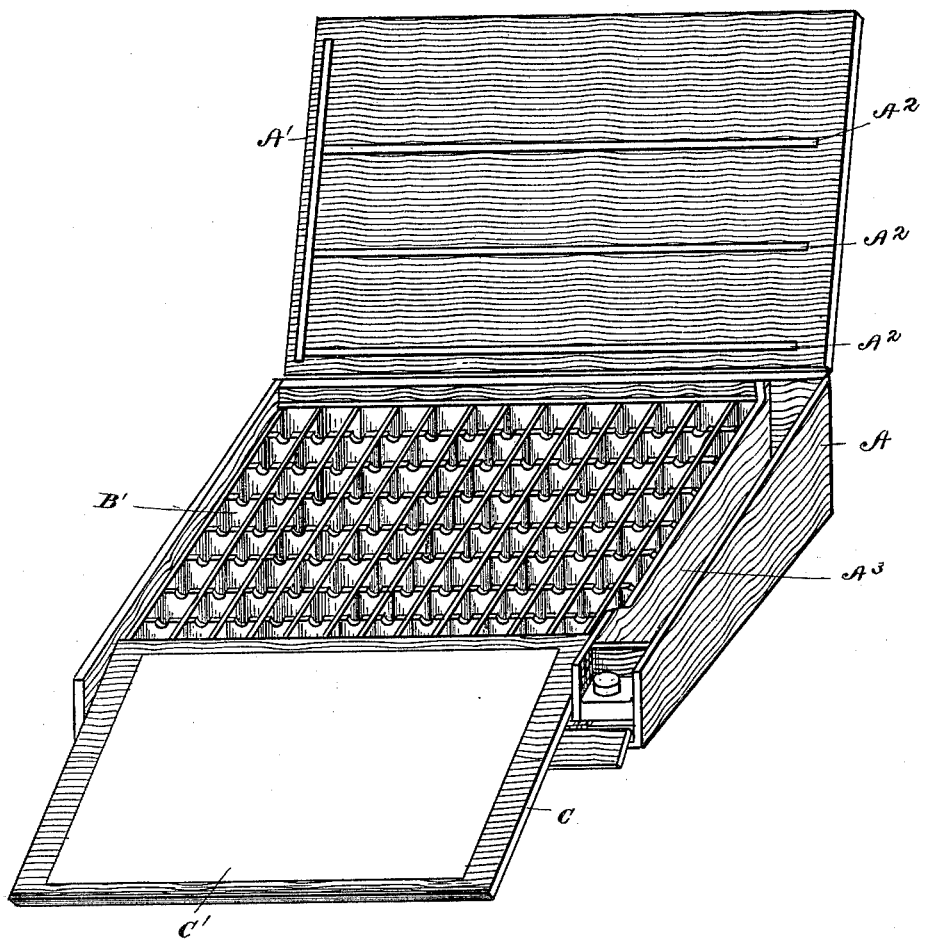
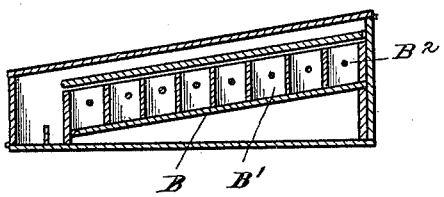

UNITED STATES PATENT OFFICE.

JOHN H. HARGENS, OF SAN FRANCISCO, CALIFORNIA.

EDUCATIONAL APPLIANCE.

SPECIFICATION forming part of Letters Patent No. 626,423, dated June 6, 1899.

Application filed February 3, 1899. Serial No. 704,403. (No model.)

*To all whom it may concern:*

Be it known that I, JOHN H. HARGENS, a citizen of the United States, residing at San Francisco, in the county of San Francisco and State of California, have invented certain new and useful Improvements in Educational Appliances; and I do hereby declare the following to be a full, clear, and exact description of said invention, such as will enable others skilled in the art to which it most nearly appertains to make, use, and practice the same.

This invention relates to improvements in educational appliances, and more particularly to appliances for individual instruction; and it consists in the novel combination of the elements, as hereinafter more fully set forth.

The principal object in the present invention is to combine in a neat compact form compartments for stationery, pencils, ink, &c., a hinged member upon which characters may be erasably written, and a font-tray for containing alphabetical characters, the whole inclosed within a box having a hinged lid, upon the inner surface of which are formed suitable means for holding the said alphabetical characters arranged to form words or phrases to familiarize the pupil with the elements constituting a vocabulary.

In the drawings, Figure 1 is a perspective view from in front, the box being open and the hinged writing member in operative position. Fig. 2 is a vertical cross-section, the box being closed.

In the description with reference to the drawings the designating-letter A will be assigned to the box having the hinged lid and inclosing sides, the letter B to the font-tray having the compartments to hold the alphabetical characters, and the letter C to the hinged member having the surface for erasable writing thereon. This surface may be of slate, celluloid, porcelain, or any of the well-known substances for this purpose.

The minor parts in the combination will be distinguished by the addition of a numeral to the common letter assigned to the group to which it belongs.

The educational feature of this invention consists of the font-box B, subdivided into the compartments B' to contain the characters, such as the alphabet, numerals, punctuations, mathematical signs, &c., printed upon thin strips of cardboard, celluloid, or any suitable material, that preferred by me being celluloid, as being best calculated to withstand the wear and tear of handling. Placed upon the inner surface of the lid A' of the box are the strips $A^2$. The upper edges of said strips are slotted or otherwise adapted to engage the edge of the cards, so as to display the characters thereon in line for the purpose aforesaid. In the construction of words and sentences in this manner the pupil in hunting out, placing, and redistributing becomes familiar with the various characters and their significance.

The upper surface C' of the hinged member C, adapted to swing outward from the box, is composed of some substance from which writing may be erased. The methods of instruction which may be pursued in connection with the means embodied in this invention are numerous. The instructor may write a copy upon the surface C' for the pupil to duplicate by means of the characters contained in the font-tray B, or larger cards, for which the compartment $A^3$ is provided, having printed thereon arithmetical problems, the answers to be supplied by the pupil from the font-tray or the pictures of animals. The names to be supplied in a like manner may be used in connection with the strips $A^2$.

Between the bottom of the font-tray B and the bottom of the box sufficient space is left for stationery, while the front of the box is divided into compartments for pencils, pens, a ruler, and ink-well. The front of the box is hinged to fall outward and downward to act as a support for the hinged member C when same is open.

To separate the cards in the font-tray B to accommodate the fingers in withdrawing said cards, the slender rods $B^2$ are extended from side to side of the tray B and through the compartment B' thereof, serving the double purpose of maintaining the cards upright and providing for space between the cards contained within each compartment B' for the accommodation of the figures, as aforesaid.

Having thus described this invention, it is claimed—

1. In an educational appliance, the combination of a font-tray, to contain cards having devices printed thereon, a box with a hinged lid, having means thereon for holding said cards; the front piece of said box being hinged, and adapted to swing outward, and downward to act as a support for a member pivoted between the sides of said box, and normally covering said font-tray, and adapted to be extended outward to be written upon; and compartments in the body of said box for writing materials, substantially as described.

2. In an educational appliance, the combination of a box having a hinged lid, and front; compartments for containing writing material; a pivoted member having a surface, prepared to be erasably written upon, adapted to fold within the body of said box, over a font-tray divided in compartments; rods extended from side to side of said font-tray in one direction intersecting said compartments at approximately their centers; means provided on the surface of the hinged lid of said box, to display characters printed upon cards adapted to be contained in said font-tray, substantially as described.

In testimony whereof I have hereunto set my hand this 18th day of November, 1898.

JOHN H. HARGENS.

Witnesses:
F. C. WEGENER,
JOS. A. WILSON.